United States Patent [19]

Evans

[11] Patent Number: 5,318,139
[45] Date of Patent: Jun. 7, 1994

[54] REDUCED WAITING TIME HYDRAULIC DRILLING JAR

[76] Inventor: Robert W. Evans, P.O. Box 2866, Conroe, Tex. 77305

[21] Appl. No.: 54,718

[22] Filed: Apr. 29, 1993

[51] Int. Cl.$^5$ .................... E21B 4/14; E21B 31/113
[52] U.S. Cl. ................... 175/297; 92/181 P; 92/183; 166/178; 166/301; 175/299; 175/300
[58] Field of Search ............. 175/297, 299, 300, 296; 166/178, 301; 92/183, 111, 181 P; 417/545, 546, 525, 495, 444; 91/487, 422, 38, 29

[56] References Cited

U.S. PATENT DOCUMENTS

| | | | |
|---|---|---|---|
| 2,801,595 | 8/1957 | Knabe et al. | 417/546 X |
| 3,380,247 | 4/1968 | Colmerauer | 417/546 X |
| 3,768,932 | 10/1973 | Svercl et al. | 92/183 X |
| 4,566,546 | 1/1986 | Evans | 175/297 |
| 4,923,373 | 5/1990 | Rothaar et al. | 417/545 X |
| 5,086,853 | 2/1992 | Evans | 175/297 |
| 5,123,493 | 6/1992 | Wenzel | 175/297 |

*Primary Examiner*—Stephen J. Novosad
*Attorney, Agent, or Firm*—Arnold, White & Durkee

[57] ABSTRACT

A reduce waiting time drilling jar 1 includes a mandrel 2, a housing 3 telescopingly positioned about the mandrel 2, and first and second pistons 89, 111 positioned axially between the mandrel 2 and the housing 3. The pistons 89, 111 are spaced longitudinally apart, forming a substantially sealed chamber 88 therebetween. The first piston 89 has a first and second substantially parallel flow passage 94, 200 formed therein and extending longitudinally therethrough to provide first and second flow characteristics. A valve 204 is hydraulically connected to the second flow passage 200. The valve 204 is translatable between first and second operating positions, wherein fluid flows relatively freely through the second flow passage 200 in the first operating position, but is restricted in the second operating position. A pressure relief valve 206 is hydraulically coupled to the substantially sealed chamber 88, and mechanically coupled to the valve 204, wherein movement of the pressure relief valve 206 biases the valve 204 between its first and second operating positions in response to the pressure in the chamber 88 rising above a preselected value.

11 Claims, 3 Drawing Sheets

HIGH PRESSURE SIDE OF PISTON   DIRECTION OF PISTON TRAVEL

REDUCED WAITING TIME HYDRAULIC DRILLING JAR

BACKGROUND OF THE INVENTION

1. Technical Field

This invention relates generally to hydraulic jars for use in drilling equipment and, in particular, to an improved actuating mechanism in which the time required for the jar to trigger is reduced at the initial portion of the waiting time overpull curve, where the waiting time is normally greatest.

1. Description of the Related Art

Drilling jars have long been known in the field of well drilling equipment. A drilling jar is a tool employed when either drilling or production equipment has become stuck to such a degree that it cannot be readily dislodged from the wellbore. The drilling jar is normally placed in the pipe string in the region of the stuck object and allows an operator at the surface to deliver a series of impact blows to the drill string via a manipulation of the drill string. Hopefully, these impact blows to the drill string dislodge the stuck object and permit continued operation.

Drilling jars contain a sliding joint which allows relative axial movement between an inner mandrel and an outer housing without allowing rotational movement. The mandrel typically has a hammer formed thereon, while the housing includes an anvil positioned adjacent the mandrel hammer. Thus, by sliding the hammer and anvil together at high velocity, they transmit a very substantial impact to the stuck drill string, which is often sufficient to jar the drill string free. High velocity is achieved by providing a fluid filled chamber that resists relative movement between the inner mandrel and outer housing for a preselected period of time. Thereafter, the resistance is rapidly and substantially reduced, and the inner mandrel and outer housing are free to move very rapidly relative to one another. Typically, the fluid chamber is pressurized by an initial movement between the inner mandrel and outer housing. Once the pressure of the chamber becomes sufficiently high, movement would cease, but for a metering orifice, which bleeds off fluid at a relatively slow rate until the jar is triggered, and the pressure is rapidly reduced.

For example U.S. Pat. No. 5,085,853, issued Feb. 11, 1992 to Robert W. Evans, describes a double acting drilling jar that contains a fluid chamber and metering orifice. The relationship between the force applied and the time to trigger the jar is exemplarly represented in FIG. 1. That is, the greater the applied force, the shorter the period of time. However, where only a very small force can be applied, the time becomes undesirably long. This can be problematic in at least two situations.

First, where the jar is being assembled into the drilling assembly outside of the well being drilled, it is common for the jar to be manipulated into its collapsed-/extended orientation by using only very small applied force. This small force will, of course, require an extended time period to collapse/extend the jar. For example, if the applied force is only about 10,000 lbs, then more than five minutes would be required to complete the task.

Second, when the drill string, with the jar assembled therein, is lowered into the well, it is common for the weight of the drill string below the jar to place sufficient force on the jar that the jar fully extends by the time that the drill bit reaches the bottom of the well. To collapse the jar before drilling, a force is applied to the jar by allowing at least a portion of the weight of the drill string to rest thereon. If a large force is applied for slightly longer than the trigger time of the jar, then the jar will be actuated strongly, driving the drill bit into the bottom of the well bore, and possibly damaging the bit. On the other hand, if only a small force is applied in order to avoid the possibility of damaging the drill bit, then the time required to collapse the jar is inordinantly long.

The present invention is directed to overcoming or minimizing one or more of the problems discussed above.

SUMMARY OF THE INVENTION

In one aspect of the present invention, a reduced waiting time drilling jar is provided. The jar includes a mandrel, a housing telescopingly positioned about the mandrel, and first and second pistons positioned axially between the mandrel and the housing and spaced longitudinally apart to form a substantially sealed chamber therebetween. The first piston has a first and second substantially parallel flow passage formed therein and extending longitudinally therethrough. A valve is hydraulically connected to the second flow passage. The valve is translatable between first and second operating positions, wherein fluid flows through the second flow passage in the first operating position and fluid flow through the second flow passage is restricted in the second operating position. A pressure relief valve is provided for biasing the valve between its first and second operating positions in response to the pressure in the sealed chamber rising above a preselected value.

In another aspect of the present invention a piston for use in forming a seal in a substantially sealed chamber of a hydraulic tool is provided. The piston has a first and second substantially parallel flow passage formed therein and extending longitudinally therethrough. A valve is hydraulically connected to the second flow passage. The valve is translatable between first and second operating positions, wherein fluid flows through the second flow passage in the first operating position and fluid flow through the second flow passage is restricted in the second operating position. A pressure relief valve is provided for biasing the valve between its first and second operating positions in response to the pressure in the sealed chamber rising above a preselected value.

BRIEF DESCRIPTION OF THE DRAWINGS

Other objects and advantages of the invention will become apparent upon reading the following detailed description and upon reference to the drawings in which.

Figure 1:
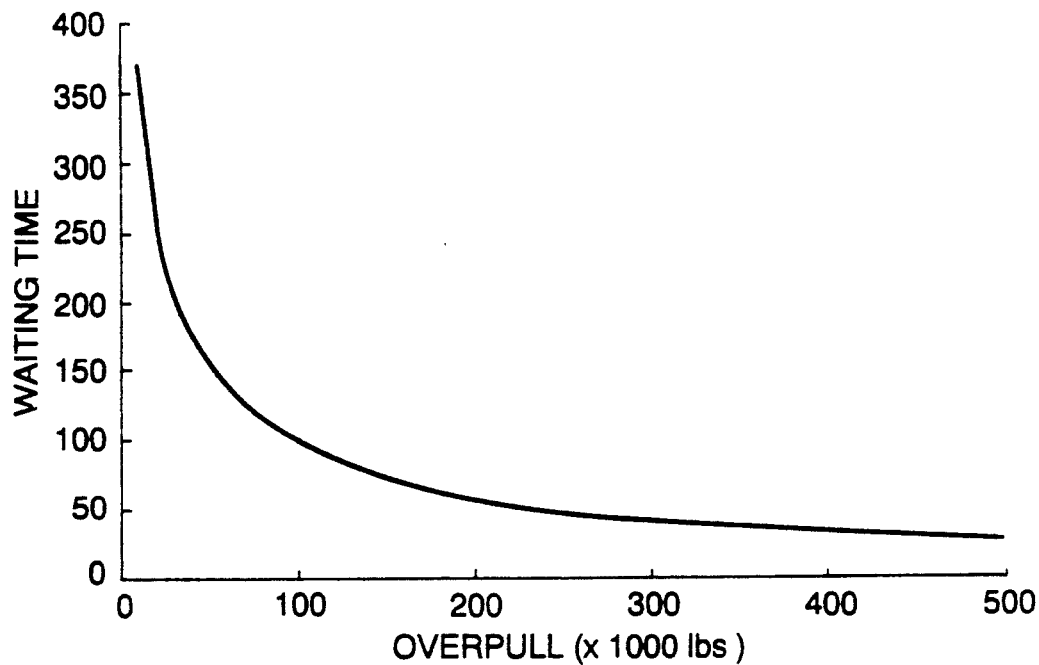
FIG. 1 illustrates a graphical representation of waiting time versus applied force in a representative prior art drilling jar.

While the invention is susceptible to various modifications and alternative forms, specific embodiments thereof have been shown by way of example in the drawings and will herein be described in detail. It should be understood, however, that this specification is not intended to limit the invention to the particular forms disclosed herein, but on the contrary, the intention is to cover all modifications, equivalents, and alternatives falling within the spirit and scope of the invention, as defined by the appended claims.

DESCRIPTION OF A PREFERRED EMBODIMENT

Figure 3A:
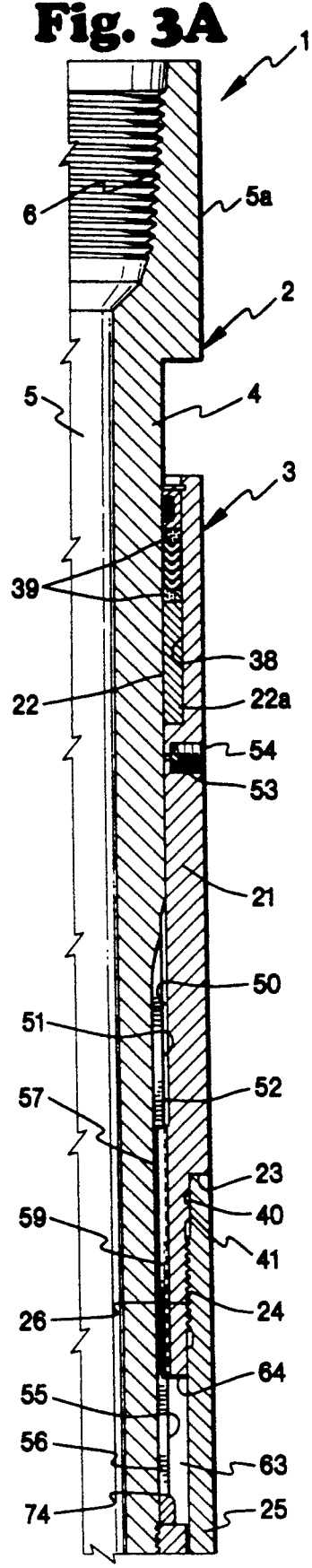
FIGS. 3A–3C illustrate successive portions, in quarter section, of a double acting hydraulic drilling jar located in its neutral operating position.
Figure 3B:
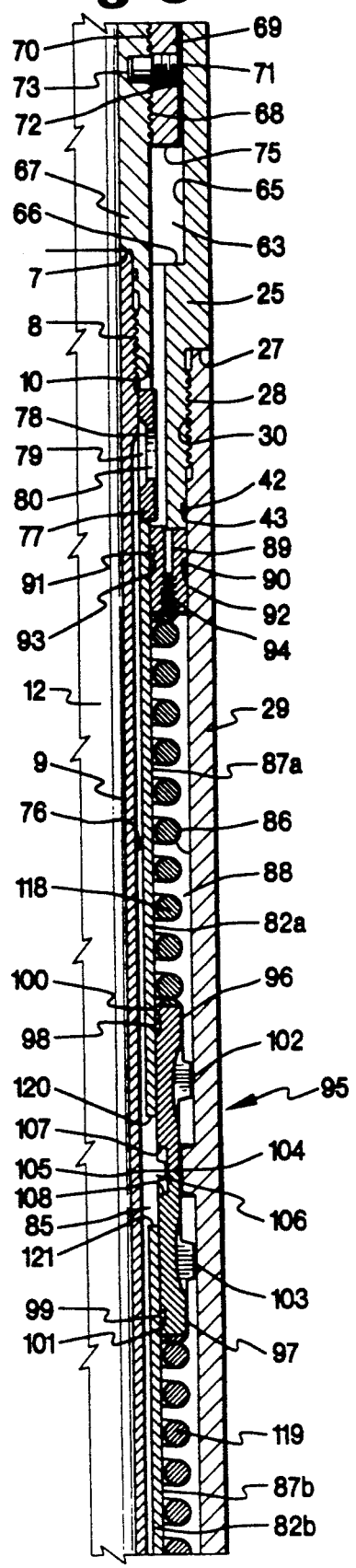
Figure 3C:
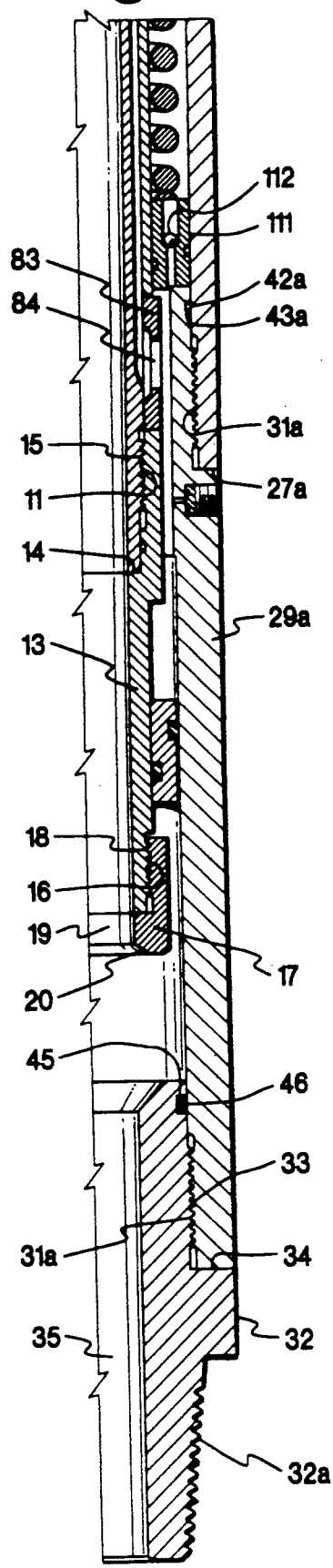

Referring now to the drawings, and, in particular, to FIGS. 3A-3C, inclusive, there is shown a double acting hydraulic mechanism or drilling jar 1 which is of substantial length necessitating that it be shown in three longitudinally broken quarter sectional views, viz. FIGS. 3A, 3B, and 3C. Each of these views is shown in longitudinal section extending from the center line (represented by a dashed line) of the jar 1 to the outer periphery thereof. The drilling jar 1 generally comprises an inner tubular mandrel 2 telescopingly supported inside an outer tubular housing 3. The mandrel 2 and housing 3 each consists of a plurality of tubular segments joined together preferably by threaded interconnections.

The mandrel 2 consists of an upper tubular portion 4 having an inner longitudinal passage 5 extending therethrough. The upper end of the upper tubular portion 4 is enlarged as indicated at 5a and is internally threaded at 6 for connection to a conventional drill string or the like (not shown). The lower end of the upper tubular portion 4 is provided with a counterbore ending in an internal shoulder 7 and is internally threaded as indicated at 8. An intermediate portion of the mandrel 2 consists of a tubular portion 9 which has its upper end threaded as indicated at 10 for connection inside the threaded portion 8 of the upper tubular portion 4 with the upper end portion abutting the shoulder 7. The lower end of the tubular portion 9 is threaded externally as indicated at 11 and is provided with an internal bore or passage 12, which is a continuation of the passage 5 in the upper tubular portion 4. The lower end of the mandrel 2 consists of a tubular portion 13, which is provided with a counterbore ending in a shoulder 14 and internally threaded as indicated at 15. The tubular portion 13 is threadedly assembled to the lower end of the tubular portion 9, with the lower end thereof abutting the shoulder 14.

The lower end portion of the tubular portion 13 is threaded as indicated at 16. A sleeve member 17 having internal threads 18 is threadedly secured on the lower end of the tubular portion 13. The tubular portion 13 is provided with an internal longitudinal passage 19 which is an extension of the passages 5, 12 and opens through a central opening 20 of the sleeve member 17. The three portions 4, 9, 13 of the mandrel 2, are threadedly assembled, as shown, into the unitary tubular mandrel 2 which is longitudinally movable inside the tubular housing 3.

The tubular housing 3 is formed in several sections for purposes of assembly, somewhat similar to the mandrel 2. The upper end of the tubular housing 3 consists of a tubular member 21 which has a smooth inner bore 22 formed by a conventional bearing 22a at its upper end in which the exterior surface of the upper mandrel tubular portion 4 is positioned for longitudinal, sliding movement. The lower end portion of the tubular housing member 21 has a portion of reduced diameter forming an annular shoulder 23 and having an exterior threaded portion 24.

The tubular housing 3 is provided with an intermediate tubular member 25 which is internally threaded as indicated at 26 at its upper end for threaded connection to the threaded portion 24 of the tubular member 21. The upper end of the intermediate tubular member 25 abuts the shoulder 23 when the threaded connection is securely tightened. The lower end portion of the tubular member 25 has a portion of reduced diameter forming a shoulder 27 and externally threaded, as indicated at 28.

The lower portion of the tubular housing 3 consists of a tubular member 29 which is internally threaded, as indicated at 30, at its upper end for connection to the threaded portion 28 of the intermediate tubular member 25. The upper end of the lower tubular member 29 abuts the shoulder 27 when the threaded connection is securely tightened. The lower end of the tubular member 29 is internally threaded, as indicated at 31.

A tubular member 29a is threadedly connected at its upper end to the threaded portion 28 of the tubular member 29 in abutting relation with the shoulder 27. The lower end of the tubular member 29a includes a threaded portion 31a engageable with a tubular connecting member 32. The tubular connecting member 32 is externally threaded, as indicated at 33, at its upper end and has a shoulder 34 against which the lower end of the tubular member 29a abuts when the threaded connection 31a, 33 is securely tightened. The tubular connecting member 32 has an inner longitudinal passage 35 which is a continuation of the passages 5, 12, 19 through the mandrel 2. The lower end of the tubular connecting member 32 is of a reduced diameter and is provided with an externally threaded surface 32a for connection into the lower portion of a drill string or for connection to a fish, or the like (not shown), when the apparatus is used as a fishing jar.

As has already been noted, the mandrel 2 and housing 3 are formed in sections for purposes of assembly. The mandrel 2 is arranged for sliding movement inside housing 3. The drilling jar 1 is filled with a suitable operating fluid, e.g. hydraulic fluid, and it is therefore necessary to provide seals against leakage from threaded joints formed at various sections of the mandrel 2 and housing 3 and also from the points of sliding engagement between the mandrel 2 and housing 3.

As previously noted, the exterior surface of the upper mandrel portion 4 has a sliding fit in the bore 22 of the upper tubular member 21 of the housing 3. The tubular member 21 is provided with at least one internal annular recess 38 in which there is positioned at least one seal 39, which seals the sliding joint against leakage of hydraulic fluid. Likewise, the threaded connection between the tubular housing members 21, 25 is sealed against leakage by an O-ring 40, or the like, positioned in an external peripheral groove 41 in the lower end of the tubular housing member 21. The threaded connection between the tubular housing members 25, 29 is similarly sealed against fluid leakage by an O-ring 42 positioned in a peripheral groove 43 in the lower end portion of the tubular housing member 25. Likewise, the threaded connection between the tubular housing members 29, 29a is sealed against fluid leakage by an O-ring 42a positioned in a peripheral groove 43a in the lower end portion of the tubular housing member 29a.

Finally, the threaded connection between the lower end of the tubular housing member 29 and the tubular connecting member 32 is similarly sealed against leakage of fluid by an O-ring 46 positioned in a peripheral groove 45 in the upper end of the tubular connecting member 32. Similar seals are provided to prevent leakage through the threaded joints connecting the several sections of the mandrel 2.

The space between the inner bore of the various components of the housing 3 and the external surface of the mandrel 2 provides an enclosed chamber and passages for the flow of hydraulic fluid (or other suitable operating fluid) throughout the drilling jar 1.

At the upper end of the tubular housing member 21, the space between an inner bore 50 thereof and an external surface 51 of the mandrel tubular portion 4 provides a chamber 52. The upper end of the chamber 52 is provided with a threaded opening 53 in which a threaded plug member 54 is secured. The threaded opening 53 provides for the introduction of hydraulic fluid (or other suitable operating fluid).

The exterior surface of the tubular mandrel portion 4 is of slightly reduced diameter at a lower end portion 55 thereof, and is provided with a plurality of longitudinally extending grooves 56 forming splines therebetween. The lower end portion of the housing tubular member 21 is provided with an inner bore 57 having a plurality of longitudinally extending grooves 59 therein and circumferentially spaced to define a plurality of splines therebetween to interact with the splines and grooves 56 in the upper tubular mandrel portion 4. The grooves 56, 59 in the tubular housing member 21 and in the tubular mandrel portion 4 are of greater depth than the height of the opposed splines positioned in those grooves 56, 59. As a result, longitudinal passages are provided along the respective grooves 56, 59 in the mandrel portion 4 and the housing member 21. The passages formed by the clearance between the splines and grooves 56, 59 permit hydraulic fluid to flow between the chamber 52 and the lower portions of the drilling jar 1, as will be subsequently described.

Additionally, the arrangement of longitudinally extending splines and grooves 56, 59 in the tubular housing member 21 and on the tubular mandrel portion 4 provides a guide for longitudinal movement of the mandrel 2 in the housing 3 without permitting rotary movement therebetween.

The clearance between the tubular housing member 25 and the mandrel portions 4, 9 is such that there is provided a hydraulic chamber 63 of substantially enlarged size relative to the hydraulic chamber 52. Within this enlarged chamber 63 is located the jarring apparatus, and, in particular, the hammer and anvil. The lower end of the tubular housing member 21 provides an upper anvil surface 64 which is utilized when the drilling jar 1 is actuated in an upward direction. An inner surface 65 of the tubular housing member 25 constitutes a counterbore which produces an internal circumferential shoulder at the lower end of the hydraulic chamber 63 and functions as an anvil 66 when the drilling jar is actuated in a downward direction.

The lower end portion 67 of the tubular mandrel portion 4 has its external surface 55 threaded, as indicated at 68. A hollow cylindrical hammer 69, having internal threads 70, is threadedly secured on the threaded portion 68 of the tubular mandrel portion 4 and is provided with a threaded plug or set screw 71 which extends through a threaded opening 72 into a recess 73 in the tubular mandrel portion 4. The hollow cylindrical hammer 69 is, therefore, threadedly secured o the lower end portion of the tubular mandrel portion 4 and further secured by the set screw 71 against rotation during operation. An upper end portion 74 of the hammer 69 is engageable during an upward actuation with the anvil surface 64 on the housing member 21. A lower hammer surface 75 of the hammer member 69 is engageable with the anvil surface 66 during a downward actuation of the drilling jar 1.

The tubular mandrel portion 9 is provided with a plurality of longitudinally extending grooves 76. The grooves 76 provide flow passages for the flow of hydraulic fluid, as will be subsequently described. A spacer ring 77 is supported on the tubular mandrel portion 9 and has an internal surface 78 spaced from the exterior surface of the mandrel portion 9 to provide an annular flow passage 79.

The spacer ring 77 is provided with apertures 80 which open from the passage 79 into the hydraulic chamber 63. The lower end of the passage 79 also overlaps the upper end of the grooves or passages 76 to provide continuous fluid communication between the hydraulic chamber 63 and the grooves 76. The upper end of the spacer ring 77 abuts the lower end of the tubular mandrel portion 4. The lower end of the spacer ring 77 is, in turn, abutted by the upper end of a first tubular portion 82a which fits over the external surface of the mandrel portion 9 in which the grooves 76 are formed. The first tubular portion 82a, therefore, encloses the grooves 76 and defines a system of longitudinally extending passages. The lower end of a second tubular portion 82b abuts an annular spacer ring 83 which is provided with a plurality of apertures 84 opening into the ends of the grooves or passages 76. The lower end of the first tubular portion 82a and the lower end of the second tubular portion 82b are also provided with a plurality of apertures or openings 85 that are controlled by a tripping valve 95, which will be subsequently described in great detail.

An inner surface 86 of the housing member 29 and outer surfaces 87a, 87b of the tubular portions 82a, 82b are spaced apart to define a hydraulic chamber 88. Generally, the hydraulic chamber 88 resists relative longitudinal movement of the mandrel 2 and housing 3. That is, relative movement of the mandrel 2 and housing 3 reduces the volume of the chamber 88, causing a significant increase in the internal pressure of the chamber 88, thereby producing a force to resist this relative movement. This resistance to relative movement allows a large buildup of static energy. Thus, by quickly venting the chamber 88 to dramatically reduce the pressure therein, the static energy is converted to kinetic energy, causing the hammer 69 to move rapidly and strike one of the anvil surfaces 64, 66 with great force.

Accordingly, means is provided for substantially sealing the chamber 88 to permit the buildup of pressure therein. The surfaces 86, 87a, 87b of the chamber 88 are smooth cylindrical surfaces permitting free movement of a pair of pressure pistons supported therebetween and defining the chamber 88. At the upper end of the hydraulic chamber 88, there is provided an annular pressure piston 89 positioned between the surfaces 86, 87a for sliding movement therebetween. The piston 89 is sealed against fluid leakage by O-rings 90, 91 positioned in annular grooves 92, 93, respectively. Movement of the piston 89 is caused by engagement with the mandrel 2 and, in particular, a shoulder formed by the end of the spacer ring 77.

It should be appreciated that if the chamber 88 were perfectly sealed against the loss of hydraulic fluid, then little or no movement between the mandrel 2 and housing 3 would occur during pressurization of the chamber 88. Some movement, however, is preferred as a means to initiate the venting process. Accordingly, the piston 89 is provided with at least one passage 94 to permit a small leakage flow of hydraulic fluid therethrough. Alternatively, leakage flow can be provided by a loose fit of the piston 89 within the chamber 88. In any event, the leakage flow causes slow deliberate movement of the mandrel 2 into the housing 3. This movement, as described more fully below, is used to actuate the tripping valve 95 and quickly vent the chamber 88. Further, in the preferred embodiment of the piston 89, additional passages and features are provided to allow for the desired reduced waiting time discussed above. These additional passages and features are discussed and shown in greater detail in FIGS. 2 and 4, discussed below.

The lower end of the chamber 88 is similarly sealed by an annular pressure piston 111, which is substantially similar to the piston 89. However, since the piston 89 is configured to provide sufficient leakage flow, then the piston 111 is sealed against outward flow from the chamber 88 by a conventional one-way check valve 112. Also, the piston 111 is moveable upwards by engagement with the annular spacer ring 83 during movement of the mandrel 2 upward and out of the housing 3.

The triggering valve 95 is positioned at approximately the center point of the chamber 88 and is urged to remain in this central position by a pair of coil springs 118, 119. The coil springs 118, 119 are positioned within the chamber 88 and respectively extend between the pressure pistons 89, 111 and the triggering valve 95. Thus, in addition to centralizing the triggering valve 95, the springs 118, 119 also operate to urge the pistons 89, 111 toward the ends of the chamber 88 and to urge the triggering valve 95 toward its closed position.

The triggering valve 95 is formed from a pair of separately moveable valve members 96, 97, which, when closed, isolate the chamber 88 from the hydraulic passage 76. The valve member 96 has an annular configuration which slidably engages the outer surface 87a of the first tubular portion 82a. The valve member 97 is of a substantially similar configuration and, likewise, slidably engages the outer surface 87b of the second tubular portion 82b. To prevent leakage between the sliding surfaces of the valve members 96, 97 and the tubular portions 82a, 82b, a pair of O-rings 98, 99 are positioned within annular grooves 100, 101 of the valve members 96, 97 respectively.

Each of the valve members 96, 97 has a flange 102, 103 formed thereon and extending radially outward toward the inner surface 86 of the tubular member 29. Preferably, the flanges 102, 103 engage the inner surface 86 in a sliding arrangement, but are not sealed therewith. Rather, the flanges 102, 103 occupy only a small circumferential portion of the chamber 88 and, therefore, form longitudinal grooves which permit the flow of hydraulic fluid therethrough. Preferably, a plurality of flanges 102, 103 are disposed in spaced relation about the circumference of the chamber 88.

The flanges 102, 103 are intended to engage and cooperate with a flange 104 extending radially inward from the tubular member 29. Preferably, the flange 104 extends about substantially the entire periphery of the tubular member 29 so that the flange 104 will engage the flanges 102, 103 independent of their circumferential position and prevent the valve members 96, 97 from passing thereby. That is, the outer diameter of the flanges 102, 103 is substantially greater than the inner diameter of the flange 104. Thus, longitudinal movement of the triggering valve 95 will cause engagement of one of the flanges 102, 103 with the flange 104, thereby urging the valve members 96, 97 to separate and hydraulically interconnect the chamber 88 with the passage 76.

However, it should be remembered that the triggering valve 95 is constructed for sliding movement on the tubular portion 82. Thus, movement of the mandrel 2 does not produce corresponding movement of the triggering valve 95. Rather, a flange 105 formed on an internal actuating mechanism 106 attached to the mandrel portion 9 is positioned to move with the tubular portion 82 and engage actuating surfaces 107, 108 located on the inner surfaces of the valve members 96, 97. Engagement of the flange 105 with the actuating surfaces 107, 108 causes the triggering valve to move longitudinally with the mandrel 2.

For purposes of understanding the instant invention, it is sufficient to realize that longitudinal movement of the mandrel 2 and, consequently, the actuating mechanism 106 results in contact between the flange 105 and one of the actuating surfaces 107, 108 to open the triggering valve 95 at the desired time. A better appreciation of the construction of the triggering valve 95 may be had by reference to U.S. Pat. No. 5,086,853, which disclosure is incorporated herein by reference.

Figure 4:
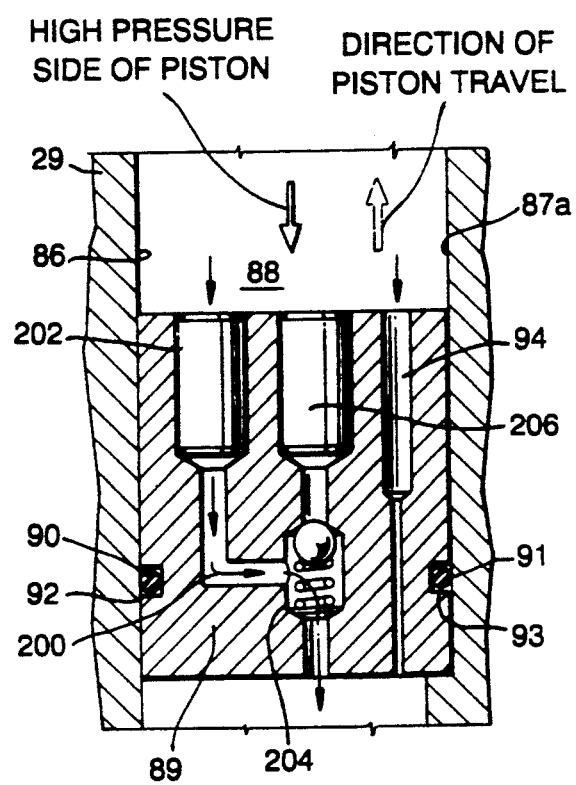
FIG. 4 illustrates a cross sectional side view of an annular pressure piston from the double acting hydraulic drilling jar of FIG. 3.

Referring now to FIG. 4, a detailed cross-sectional view of the pressure piston 89 is illustrated. The passage 94 passing from the high pressure side to the low pressure side of the piston 89 is designed to provide flow therethrough, which will produce a characteristic curve for overpull versus waiting time similar to that of FIG. 1. However, in addition to the passage 94, a second, parallel flow path 200 is provided through the piston 89. This second flow path 200 includes a constant flow rate valve 202 positioned on the high pressure side of the piston 89 and connected through a shuttle valve 204 to the low pressure side of the piston 89. Preferably, the constant flow rate valve is of conventional design, such as that available from The Lee Company located in Westbrook, Conn. Likewise, the shuttle valve is also of conventional design, like that available from The Lee Company of Westbrook, Conn. The sizing of the passages 94, 200 is such that flow through of the passage 200 is significantly greater than flow through the passage 94. Thus, when both of the passages 94, 200 are open, operation of the jar 1 will be most significantly affected by flow through the passage 200, rather than flow through the much smaller passage 94.

The constant flow rate valve 202 operates in a conventional manner to allow a preselected volume of fluid to flow therethrough independent of the pressure of the fluid on the high pressure side of the piston 89. Thus, the overpull versus time characteristics demonstrated in FIG. 1 will not apply when the predominate flow is through the constant flow rate valve 202. Rather, since flow rate is independent of pressure, the curve will be substantially flat, allowing movement of the piston 89 at a fixed, constant rate independent of pressure.

A pressure relief valve 206 is positioned in the piston 89 adjacent the high pressure side thereof. The pressure relief valve 206 is of conventional design, such as that available from the Lee Company of Westbrook, Conn. The pressure relief valve 206 is connected to and operates the shuttle valve 204, such that pressure on the high pressure side of the piston 89 above a preselected value actuates the pressure relief valve 206, causing the shuttle valve 204 to close and substantially obstruct flow through the passage 200. Thus, it should be appreciated that when the pressure on the high pressure side of the piston 89 is sufficiently high, the flow path 200 no longer operates, so that further leakage of fluid from the chamber 88 occurs substantially only through the passage 94. That is, the operating characteristics of the jar 1 return to the graph represented in FIG. 1 for pressures above this preselected pressure.

Figure 2:
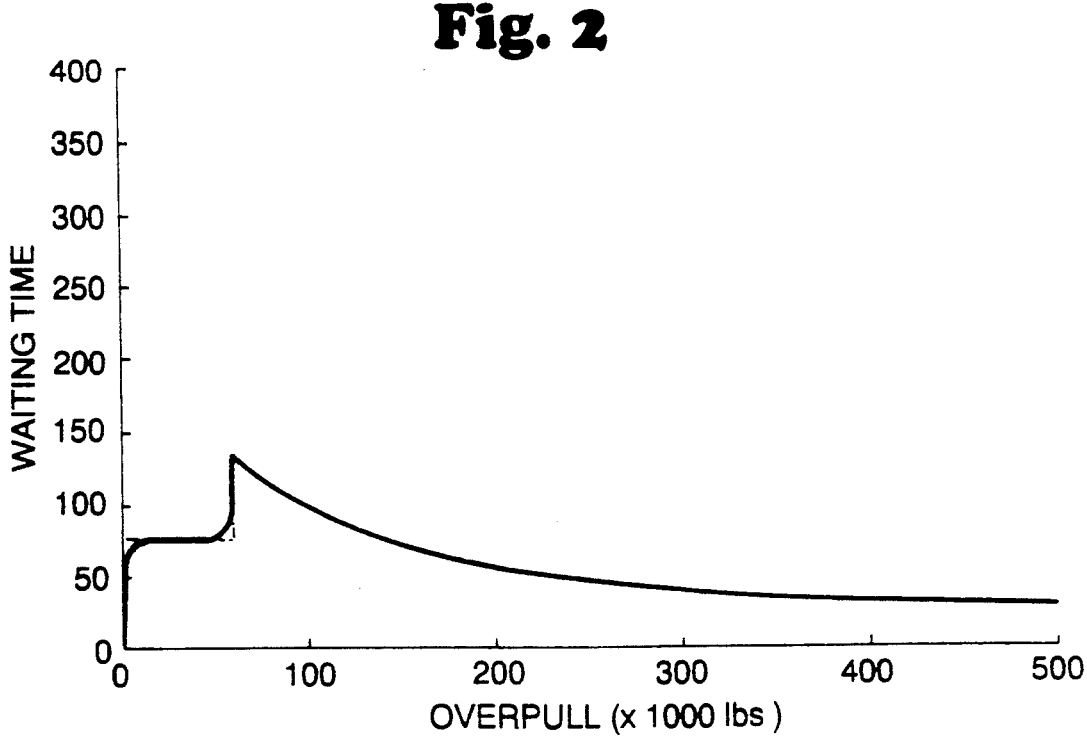
FIG. 2 illustrates a graphical representation of waiting time versus applied force in a drilling jar constructed according to the instant invention.

For example, FIG. 2 illustrates a graph of overpull versus waiting time for a drilling jar configured with a piston arrangement 89 similar to that of FIG. 4. The preselected pressure at which the pressure relief valve 206 is actuated, is selected to be approximately 75,000 lbs. Therefore, for any overpull below 75,000 lbs., the flow path 200 controls the flow through the piston 89 at a constant rate and produces a flat curve in this range. That is, the actuation time on the jar 1 is a constant approximately 75 seconds for all overpull less than about 75,000 lbs. Above 75,000 lbs. of pressure, the flow path 200 is substantially blocked by the shuttle valve 204 in response to movement of the pressure relief valve 206. Thus, flow through the piston 89 is governed by the flow passage 94 alone, and flow is not constant, but related to pressure. Thus, above 75,000 lbs. of pressure the graph of overpull versus time is substantially similar to that of FIG. 1 again.

Therefore, it should be appreciated that the jar 1 can be manipulated between its collapsed and expanded positions with relatively low operating pressures in relatively short periods of time.

Although a particular detailed embodiment of the apparatus has been described herein, it should be understood that the invention is not restricted to the details of the preferred embodiment, and many changes in design, configuration, and dimensions are possible without departing from the spirit and scope of the invention. For example, it is envisioned that the piston 89 could be designed to have a single flow path 200 in which the shuttle valve 206 could be actuated between a fully open and a partially open position, so as to provide two substantially different flow characteristics and eliminate the need for a secondary orifice.

I claim:

1. A reduced waiting time drilling jar, comprising:
   a mandrel;
   a housing telescopingly positioned about said mandrel;
   first and second pistons positioned axially between said mandrel and said housing and spaced longitudinally apart, forming a substantially sealed chamber therebetween, said first piston having a first and second substantially parallel flow passage formed therein and extending longitudinally therethrough;
   a valve hydraulically connected to said second flow passage, said valve being translatable between first and second operating positions, wherein fluid flows through said second flow passage in said first operating position and fluid flow through said second flow passage is restricted in said second operating position; and
   a pressure relief valve hydraulically coupled to said substantially sealed chamber, and being movable between first and second operating positions in response to the pressure rising above a preselected value, said pressure relief valve being coupled to said valve wherein movement of said pressure relief valve between its first and second operating positions biases said valve between its first and second operating positions.

2. A reduced waiting time drilling jar, as set forth in claim 1, including a constant flow valve hydraulically connected to said second flow passage.

3. A reduced waiting time drilling jar, as set forth in claim 1, wherein said valve is a shuttle valve.

4. A reduced waiting time drilling jar, comprising:
   a mandrel;
   a housing telescopingly positioned about said mandrel;
   first and second pistons positioned axially between said mandrel and said housing and spaced longitudinally apart, forming a substantially sealed chamber therebetween, said first piston having a first and second substantially parallel flow passage formed therein and extending longitudinally therethrough;
   a valve hydraulically connected to said second flow passage, said valve being translatable between first and second operating positions, wherein fluid flows through said second flow passage in said first operating position and fluid flow through said second flow passage is restricted in said second operating position; and
   means for biasing said valve between its first and second operating positions in response to the pressure in said sealed chamber rising above a preselected value.

5. A reduced waiting time drilling jar, as set forth in claim 4, including a constant flow valve hydraulically connected to said second flow passage.

6. A reduced waiting time drilling jar, as set forth in claim 4, wherein said valve is a shuttle valve.

7. A reduced waiting time drilling jar, as set forth in claim 4, wherein said means includes a pressure relief valve hydraulically coupled to said substantially sealed chamber, and being movable between first and second operating positions in response to the pressure in said substantially sealed chamber rising above a preselected value, said pressure relief valve being coupled to said valve wherein movement of said pressure relief valve between its first and second operating positions biases said valve between its first and second operating positions.

8. A piston for use in forming a seal in a substantially sealed chamber of a hydraulic tool, comprising:
   said piston having a first and second substantially parallel flow passage formed therein and extending longitudinally therethrough;
   a valve hydraulically connected to said second flow passage, said valve being translatable between first and second operating positions, wherein fluid flows through said second flow passage in said first operating position and fluid flow through said second flow passage is restricted in said second operating position; and
   means for biasing said valve between its first and second operating positions in response to the pressure in said sealed chamber rising above a preselected value.

9. A piston, as set forth in claim 8, including a constant flow valve hydraulically connected to said second flow passage.

10. A piston as set forth in claim 8, wherein said valve is a shuttle valve.

11. A piston, as set forth in claim 8, wherein said means includes a pressure relief valve hydraulically coupled to said substantially sealed chamber, and being movable between first and second operating positions in response to the pressure in said substantially sealed chamber rising above a preselected value, said pressure relief valve being coupled to said valve wherein movement of said pressure relief valve between its first and second operating positions biases said valve between its first and second operating positions.

* * * * *